US006619642B2

(12) United States Patent
Cannon et al.

(10) Patent No.: US 6,619,642 B2
(45) Date of Patent: Sep. 16, 2003

(54) CLAMP FOR CLAMPING A WORKPIECE

(75) Inventors: Alan J. Cannon, Chepstow (GB); Christopher P. R. Hill, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/927,934

(22) Filed: Aug. 13, 2001

(65) Prior Publication Data

US 2002/0020954 A1 Feb. 21, 2002

(30) Foreign Application Priority Data

Aug. 16, 2000 (GB) .......................................... 0020220

(51) Int. Cl.[7] .......................................... B23Q 1/00
(52) U.S. Cl. .......................... 269/46; 269/138; 269/221
(58) Field of Search ................................ 269/138, 135, 269/136, 46, 47; 74/54; 261/900, 309, 216, 217, 99, 100

(56) References Cited

U.S. PATENT DOCUMENTS

| | | | | |
|---|---|---|---|---|
| 661,322 A | * | 11/1900 | Ranz | 269/138 |
| 999,979 A | * | 8/1911 | Fisher | 269/138 |
| 3,495,867 A | * | 2/1970 | Avery | 269/221 |
| 4,240,621 A | | 12/1980 | Daddato | |
| 4,623,157 A | | 11/1986 | Rohs | |
| 4,632,375 A | | 12/1986 | Yang | |

FOREIGN PATENT DOCUMENTS

| | | |
|---|---|---|
| EP | 0 739 683 A1 | 10/1996 |
| GB | 1 289 541 A | 3/1970 |

* cited by examiner

*Primary Examiner*—George Nguyen
*Assistant Examiner*—Daniel Shanley
(74) *Attorney, Agent, or Firm*—Oliff & Berridge, PLC

(57) ABSTRACT

A clamp for clamping a workpiece such as a forging of an aerofoil component comprises a support body 24 to which a clamping member 26 is hinged. The clamping member 26 has a workpiece clamping element 54 having pads 58 for engagement with the workpiece. The workpiece clamping element 54 is pivotable relatively to the clamping member 26 by means of a ball and socket connection including a ball element 40. This enables the workpiece clamping element 54 to self-align with the profile of the workpiece, for example with a surface of the blade 6 of the aerofoil component.

In an alterative embodiment, the workpiece clamping element 54 is formed integrally with the clamping member 26, but is connected thereto by a necked region of the clamping member 26 which permits flexure of the workpiece clamping element 54 relatively to the clamping member 26.

21 Claims, 7 Drawing Sheets

CLAMP FOR CLAMPING A WORKPIECE

FIELD OF THE INVENTION

This invention relates to a clamp for clamping a workpiece, and is particularly, although not exclusively, concerned with a clamp for clamping an aerofoiled component for machining purposes.

BACKGROUND OF THE INVENTION AND PRIOR ART

The secure clamping of aerofoiled components presents difficulties because the aerofoil sections do not have flat, parallel surfaces. Also, aerofoil components formed by forging have dimensional and shape differences from one another which means that a clamping structure shaped to fit perfectly with one component will not fit perfectly with another. Such imperfect fits can result in inadequate clamping and/or marking of the aerofoil surface.

A forged aerofoil component, for example a compressor rotor blade of a gas turbine engine, must undergo various operations after forging in order to remove forging flash and forging locating pips, to form blade edge and root profiles and to tip the blade to the required length. To perform these operations, the component must be held securely while exposing those parts on which the operations are to be performed. Hand polishing, followed by a vibro-polishing operation, is commonly used to form the desired circular profiles of blade chordal edges, but this often results in the chordal edges having flats or facets which, while within engineering tolerances, do not provide optimum aerodynamic performance, resulting in a loss of efficiency of the compressor module. It is thus desirable for the aerofoil finishing operations to be performed by machine, which requires secure fixing of the component while the machining and polishing operations are performed.

An object of the present invention is to provide a clamp which is able to support a workpiece having variable profiles and dimensions.

A further object of the present invention is to provide a clamp with a workpiece clamping element which is pivotable to adapt to the surface profile of a clamped workpiece.

A yet further object of the present invention is to provide a clamp which provides firm support to parts of a component during the performance of machining and polishing operations.

SUMMARY OF THE INVENTION

According to the present invention there is provided a clamp for clamping a workpiece, the clamp comprising:

- a support body;
- a workpiece supporting element mounted on the support body:
- a clamping member mounted on the support body for displacement towards and away from the support body;
- a workpiece clamping element mounted on the clamping member;
- securing means adapted to retain the clamping member in a clamping position in which, in use, the workpiece clamping element applies a clamping force to a workpiece clamped between the workpiece clamping element and the workpiece supporting element; and
- connecting means which connects the workpiece clamping element to the clamping member for pivoting displacement relatively to the clamping member about axes lying in a plane extending transversely of the line of action of the clamping force, and for linear movement relatively to the clamping member in a direction substantially transverse to the line of action of the clamping force, whereby the workpiece clamping element is self-aligning with the surface of a clamped workpiece.

Because the workpiece clamping element is self-aligning, it is able to adapt to variations in surface profile and dimensions of the clamped workpiece, for example a forged aerofoil component.

The pivoting displacement of the workpiece clamping element may be limited, for example by contact between the workpiece clamping element and the clamping member.

In one embodiment in accordance with the present invention, the pivoting displacement is achieved by means of a ball and socket connection. The ball and socket connection may comprise a part-spherical ball element mounted on the clamping member, which engages a socket formed in the workpiece clamping element. Separate means, for example a transverse pin, may be provided to retain the workpiece clamping element on the clamping member.

Resilient means may be provided for biasing the workpiece clamping element into engagement with a face of the workpiece, the biasing force extending transversely of the line of action of the clamping force.

In an alternative embodiment, the pivoting displacement of the workpiece clamping element may be provided by connecting the workpiece clamping element to the clamping member by means of a resilient connecting element. This connecting element may comprise a necked region between the clamping member and the workpiece clamping element, the clamping member, the necked region and the workpiece clamping element then being integral with each other. The connecting element may be situated generally centrally of the workpiece clamping element.

Around the connecting element, the workpiece clamping element may be separated from the clamping member by machined slots, closure of the slots upon deflection of the workpiece clamping element limiting the extent of displacement of the workpiece clamping element relatively to the clamping member.

The clamp may include at least one locating element, spaced from the workpiece supporting element and the workpiece clamping element, for engagement with a surface profile of the workpiece to locate the workpiece within the clamp. The locating element may comprise a recess for receiving a protrusion or pip on the workpiece.

The support body may be mounted on a fixture for removable fitting to a machine tool or other workpiece processing equipment.

BRIEF DESCRIPTION OF THE DRAWINGS

For a better understanding of the present invention, and to show how it may be carried into effect, reference will now be made, by way of example, to the accompanying drawings, in which.

DETAILED DESCRIPTION OF PREFERRED EMBODIMENTS

Figure 1:
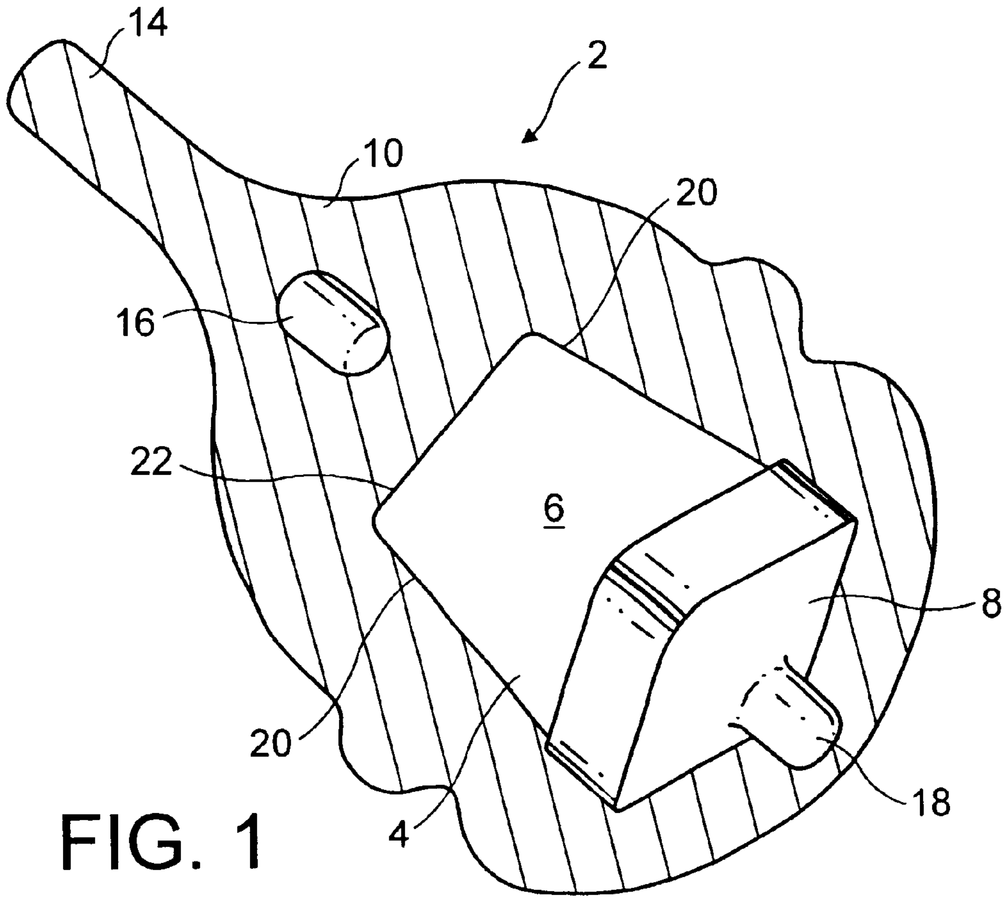
FIG. 1 shows a forged workpiece in the form of an aerofoil component.

The workpiece 2 shown in FIG. 1 comprises an aerofoil component 4 having a blade 6 and a root 8. The component 4 is surrounded by a region of forging flash 10. The forging flash 10 has a tip end 14, a tip location pip 16 and a root location pip 18.

The workpiece 2 must undergo several operations in order to finish the aerofoil component 4. Thus, the forging flash 10 must be removed, along with the location pips 16 an 18, the root 8 must be machined to a desired configuration, and the blade 6 must have its chordal edges 20 and tip 24 machined to the required dimensions and profiles.

To perform these operations, the aerofoil component must be clamped firmly so that it is prevented from moving under the machining forces. This clamping is achieved by means of the clamps shown in FIGS. 2 to 4, and FIGS. 5 to 8. The clamp shown in FIGS. 2 to 4 is employed to hold the workpiece during finishing of the blade chordal edges 20, while the clamp shown in FIGS. 5 to 8 is employed during machining of the root 8.

Figure 2:
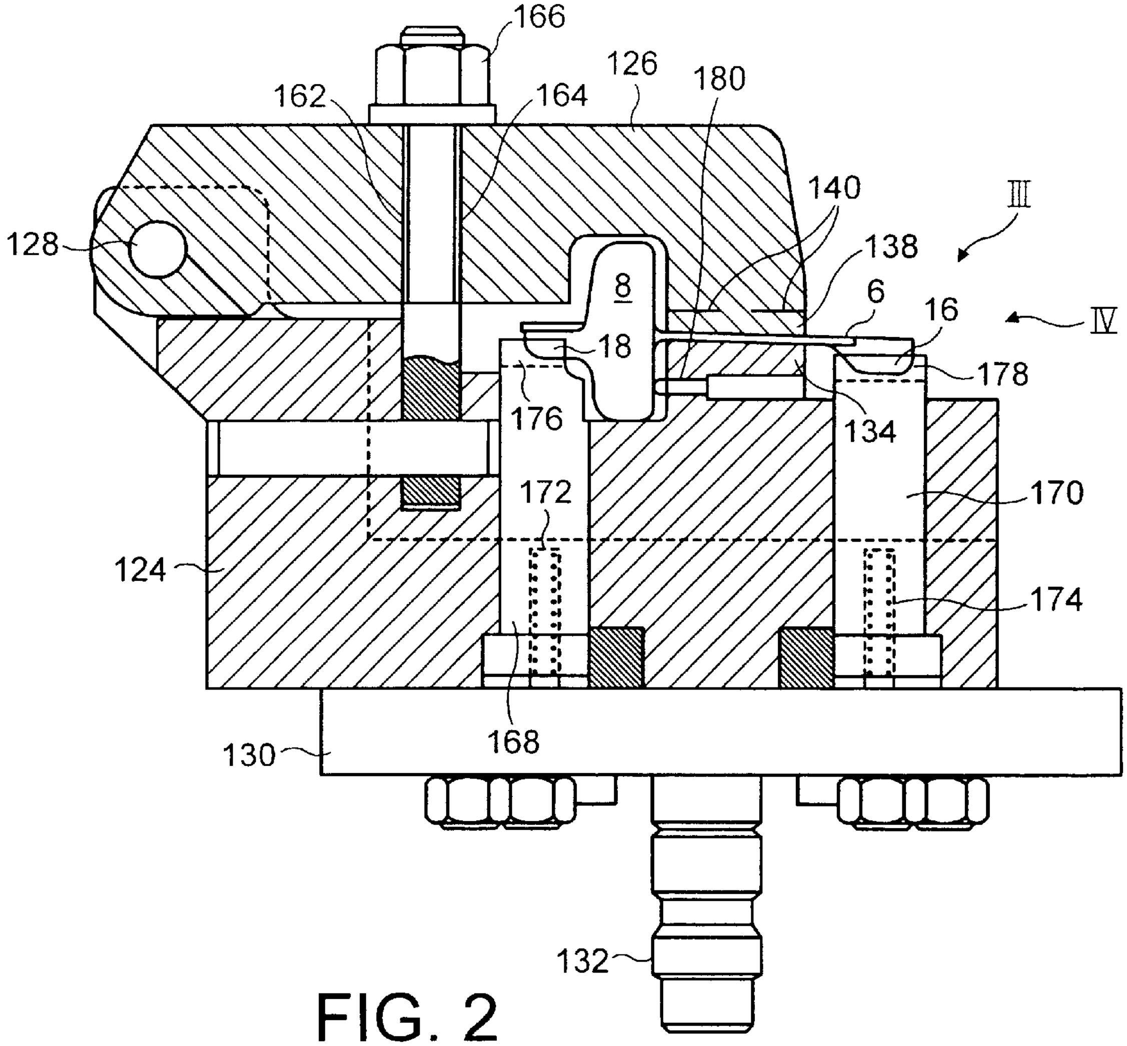
FIG. 2 is a partly sectioned side view of a clamp holding the component of FIG. 1.
Figure 3:
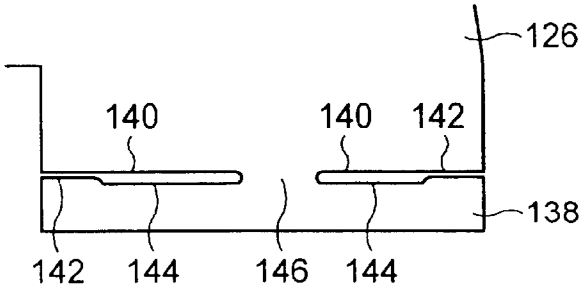
FIG. 3 is an enlarged sectional view of part of the clamp indicated by an arrow III in FIG. 2.
Figure 4:
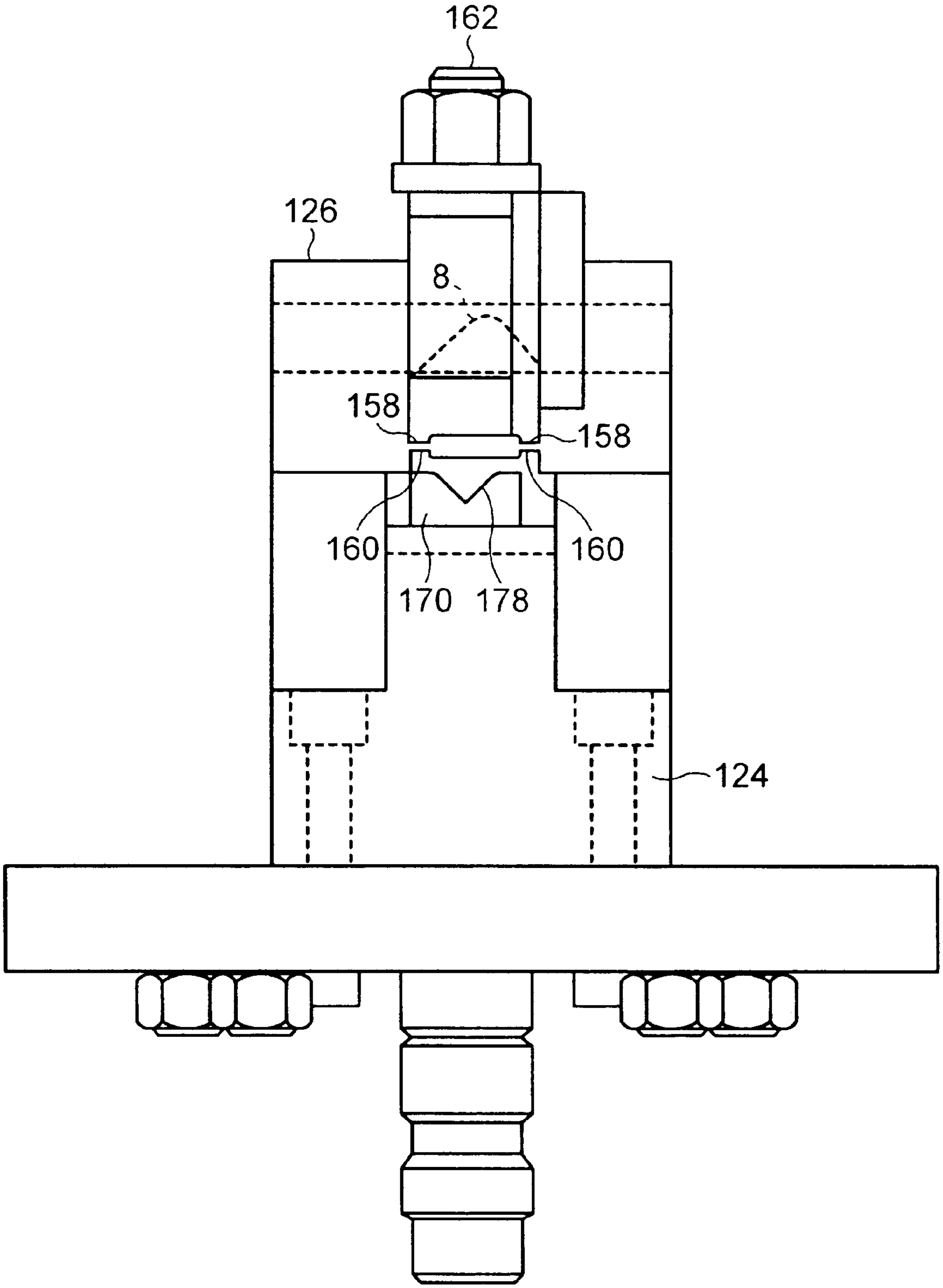
FIG. 4 is a view taken in the direction of the arrow IV in FIG. 3.

Referring first to the clamp shown in FIGS. 2 to 4, this comprises a support body 124 to which a clamping member 126 is hinged for movement about a hinge axis 128. The support body 124 is secured to an EROWA base fixing 130 having a spigot 132 for releasable fitment to, for example, a machine tool for performing operations on the workpiece 2.

The support body 124 has a workpiece supporting element 134 which is formed integrally with the support body 124. The clamping member 126 has a workpiece clamping element 138 which is formed integrally with the clamping member 126. The connection between the clamping member 126 and the workpiece clamping element 138 is shown more clearly in FIG. 5. The clamping member 126 at its end region adjacent the workpiece clamping element 138 has a generally rectangular cross-section. Slots 140 having a relatively narrow outer region 142 (having a width, for example, of 0.25 mm) and a wider inner region 144 (having a width, for example, of 0.5 mm) extend inwardly from all four sides of the clamping member 126, leaving a central connecting element or pillar 146 connecting the clamping member 126 to the workpiece clamping element 138. This pillar may, for example, have a cross-sectional area which is not greater than 20 $mm^2$, for example it may have a square cross-section with a side of 4 mm.

The slots 140 may be formed by electrical discharge wire cutting.

The slots 140 permit resilient pivoting of the workpiece clamping element 138 about the pillar 146. The pivoting movement is limited by closure of the narrow regions 142 of the slots 140, so that the maximum pivoting angle of the workpiece clamping element 138 is not greater than 2°, for example it may be 1.5°.

The workpiece clamping element 138 and the workpiece supporting element 134 each have two pads 158 and 160 respectively, for engagement with the blade 6 of an aerofoil component 2. Each pad 158 extends the full length of the respective workpiece supporting element 134 and workpiece clamping element 138, and engages the component 2 close to the respective chordal edge of the blade 6.

A stud 162 is secured to the support body 124 and extends through an opening 164 in the clamping member 126. A nut 166 engages the top end of the stud 162 and can be tightened to exert the required clamping force between the workpiece supporting element 134 and the workpiece clamping element 138.

The support body has two locating elements 168 and 170, which are spring-loaded upwardly, as seen in FIG. 4, by means of springs 172 and 174. The locating elements 168 and 170 have V-shaped recesses 176 and 178 at their upper ends, which, in use, receive the locating pips 18 and 16 of the aerofoil component (FIG. 1).

A spring-loaded domed platform location pin 180 is provided in the workpiece supporting element 134 for abutment with the annulus surface of the root 8 from which the blade 6 extends. Although not shown, a separate clamping device may be provided for retaining the tip pip 16 in the locating recess 178.

For use, as shown in FIG. 4, the aerofoil component 2 is positioned on the workpiece supporting element 134 and located by engagement of the locating pips 16 and 18 in the recesses 176 and 178. The position of the workpiece 4 in the lengthwise direction of the blade 6 is established by the location pin 180. The clamping member 126 is then lowered to bring the workpiece clamping element 138 into engagement with the upper side of the blade 6, and the nut 166 is tightened to clamp the blade 6 between the workpiece supporting element 134 and the workpiece clamping element 138. Variations in the profile and dimensions of the blade 6 are accommodated by flexure of the pillar 146, allowing the workpiece clamping element 138 to align itself with the profile of the upper surface of the blade 6. When the workpiece 2 is clamped, machining, profiling and polishing of the blade chordal edges can be performed. While in the clamp of FIGS. 2 to 4, the blade 6 may be tipped to length, and the locating pip 16 removed. However, it is alternatively possible for this operation to be performed separately.

The workpiece 2 is then transferred to the clamp shown in FIGS. 5 to 8, which comprises a support body 24 to which a clamping member 26 is hinged for movement about a hinge axis 28. The support body 24 and the clamping member 26 are formed from aluminium. The support body 24 is secured to an EROWA base fixing 30 having a spigot 32 for releasable fitment to, for example, a machine tool for performing operations on the workpiece 2.

The support body 24 has a steel workpiece supporting element 34 secured to it by means of machine screws 36. The clamping member 26 has a steel workpiece clamping element 38 which is located relatively to the clamping member 26 by means of a ball and socket connection comprising a part-spherical ball element 40 cooperating with a hardened hemi-spherical recess 42 (FIG. 6) formed in the workpiece clamping element 38. The ball element 40 is secured to the clamping member 26 by a machine screw 44, in such a way that there is limited freedom of movement of the ball element 40 in the general direction towards and away from the root 8 of the clamped aerofoil component 2.

It will be appreciated that the ball element 40 does not retain the workpiece clamping element 38 on the clamping member 26. This function is performed by a pin 46 which is secured within the clamping member 26 by a grub screw 48.

The pin 46 extends with a clearance through a bore 50 formed in the clamping element 38.

The clearance between the pin 46 and the bore 50, and the freedom of movement of the ball element 40, permit limited pivotal displacement of the workpiece clamping element 38 relatively to the clamping member 26 about the axes defined by the ball element 40, as well as limited linear displacement.

A spring 52 acts between the clamping member 26 and the workpiece clamping element 38 to bias the workpiece clamping element 38 in a direction which is generally transverse of the line of action of the clamping force exerted by the workpiece clamping element 38 in the direction of the workpiece supporting element 34. Thus, with reference to FIG. 2, the workpiece clamping element 38 is biased towards the annular surface of the root 8 of the aerofoil component 4 shown clamped between the workpiece supporting element 34 and the workpiece clamping element 38. This brings a hardened support pad 54, provided on the workpiece clamping element 38, into contact with the annulus surface of the root 8 from which the blade 6 extends. A similar hardened pad 56 is provided on the workpiece supporting element 34.

The ball element 40 has a flat guide surface 70 which engages a complementary surface 72 formed on the clamping member 26. The surface 72, as shown in FIG. 2, is slightly angularly offset (for example by 3°) from the plane extending perpendicular to the line of action of the clamping force exerted by the clamping member 26. The result of this is that the clamping force applies a wedging action on the workpiece clamping element 38 so assisting the spring 52 in biasing the workpiece clamping element 38 into contact, via the pad 54, with the annulus surface of the root 8 of the workpiece 2.

Figure 6:
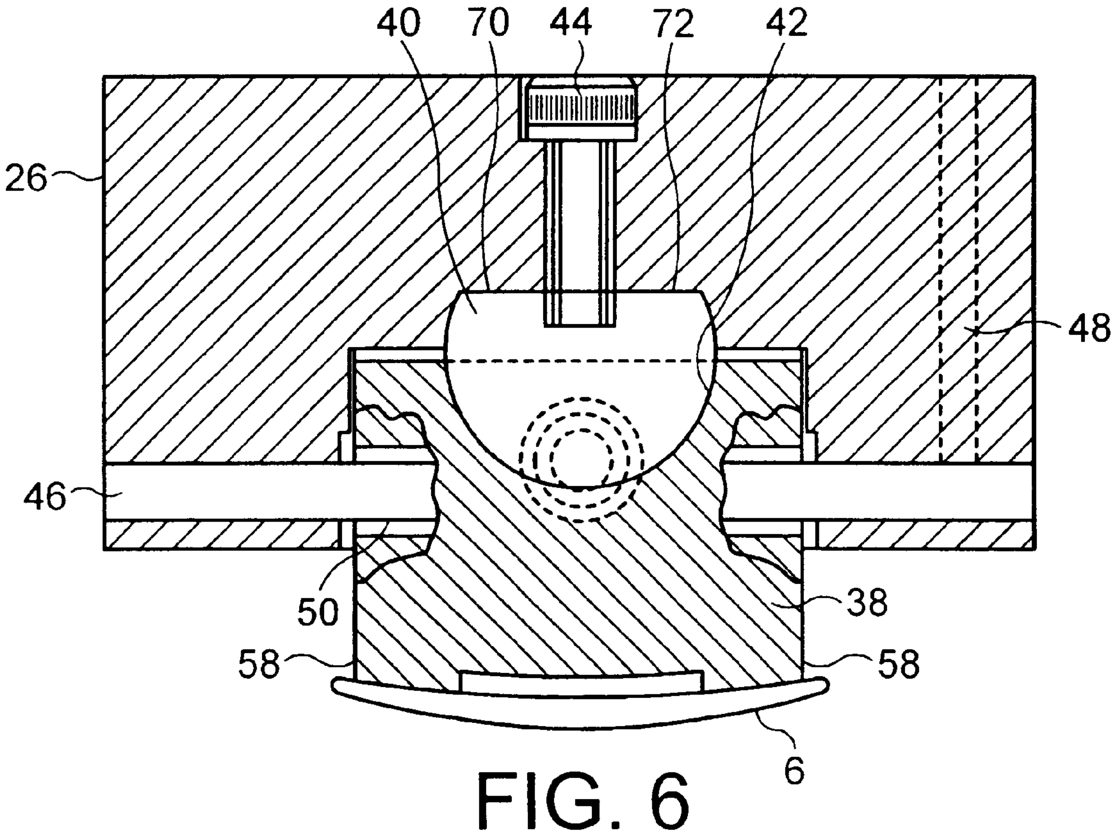
FIG. 6 is a view taken generally on line VI—VI in FIG. 5.
Figure 7:
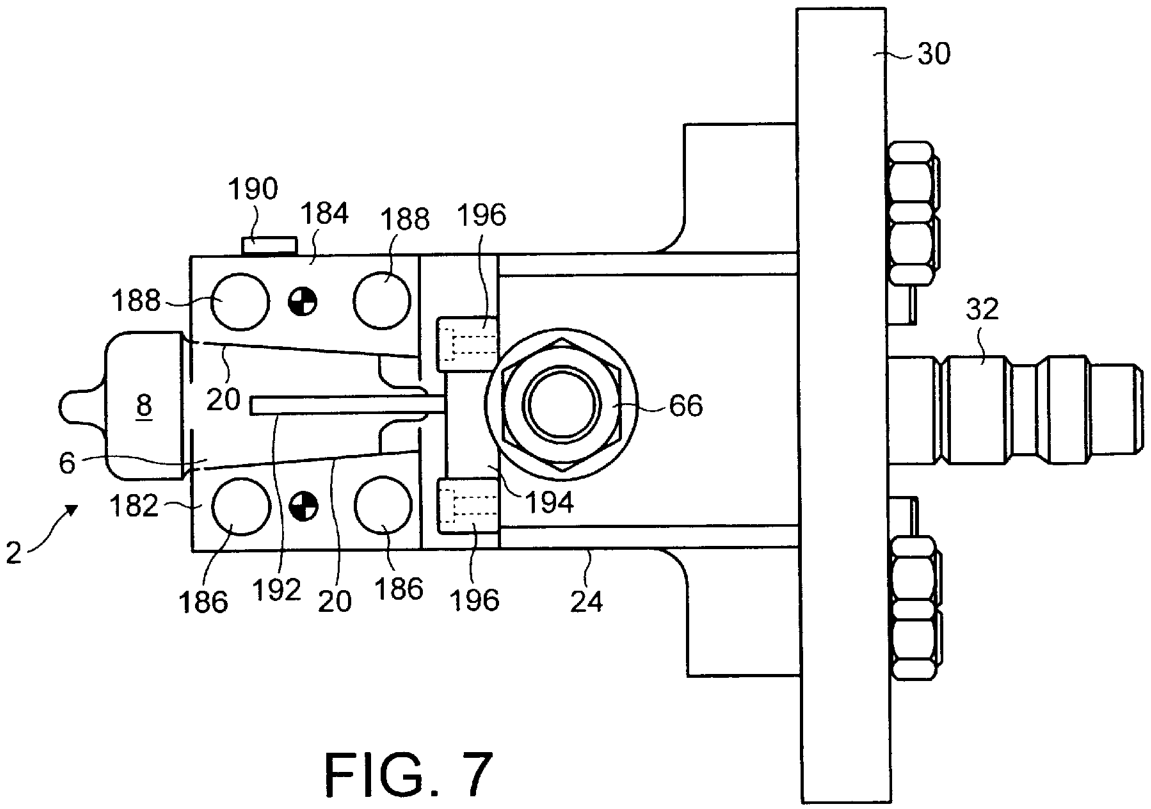
FIG. 7 is a top view of the clamp shown in FIG. 5, with the clamping member omitted.
Figure 8:
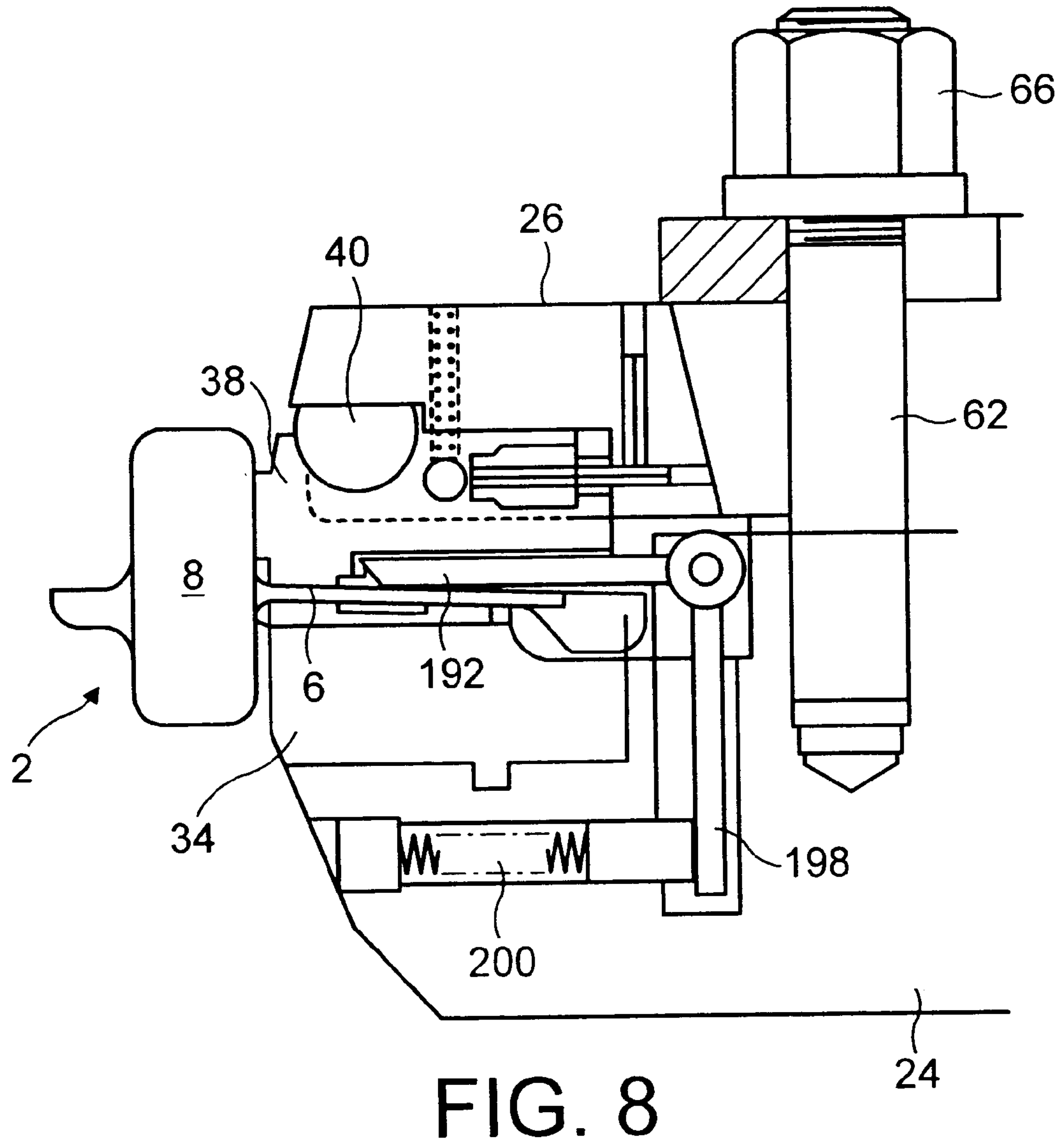
FIG. 8 is a partially sectioned view corresponding to FIG. 5.

The workpiece clamping element 38 and the workpiece supporting element 34 each have four hardened blade-engaging pads, with two adjacent each chordal edge of the blade 6, as shown in FIG. 6. These pads are plated with cubic boron nitride (CBN) that serves to prevent slip between the pads 158 and 160 and the blade 6.

A pair of jaws 182, 184 are secured to the workpiece supporting element 34. The jaw 182 is a fixed jaw and is rigidly fixed to the workpiece supporting element 34 by screws 186. The jaw 184 is a movable jaw and is retained on the workpiece supporting element 34 by screws 188. There is a clearance between these screws 188 and the holes in the movable jaw 184 in which they are received, which permits limited movement of the movable jaw 184 towards and away from the fixed jaw 182. The movable jaw 184 is biased towards the fixed jaw 182 by means of a leaf spring 190 which is fixed at one end to the workpiece supporting element 34 and bears resiliently at its other end on a side face of the movable jaw 184.

A retaining bar 192 is resiliently mounted on the support body 24. The bar 192 extends from a journal 194 which is pivotably mounted on the support body 24 by bearings 196. An operating lever 198 depends from the journal 194 and is acted upon by a spring 200.

To install the workpiece 2 in the clamp shown in FIGS. 5 to 8, the bar 192 is raised and the blade 6 is laid under it on to the pads 60 on the workpiece supporting element 34. To assist this, the jaw 184 is displaced away from the jaw 182, and, when released, is moved by the leaf spring 190 to engage the adjacent chordal edge 20 of the blade 6 to push the blade 6 into contact, at the opposite chordal edge, with the fixed jaw 182. The bar 192 is released, and is biased by the spring 200, acting through the lever 198, to contact the upper edge of the blade 6 so as to provide a preliminary holding force on the workpiece 2. The workpiece clamping element 38 is then lowered to bring the pads 58 into contact with the upper surface of the blade, these pads straddling the bar 192.

A stud 62 is secured to the support body 24 and extends through an opening 64 in the clamping member 26. A nut 66 engages the top end of the stud 62 and can be tightened to exert the required clamping force between the workpiece supporting element 34 and the workpiece clamping element 38.

Figure 5:
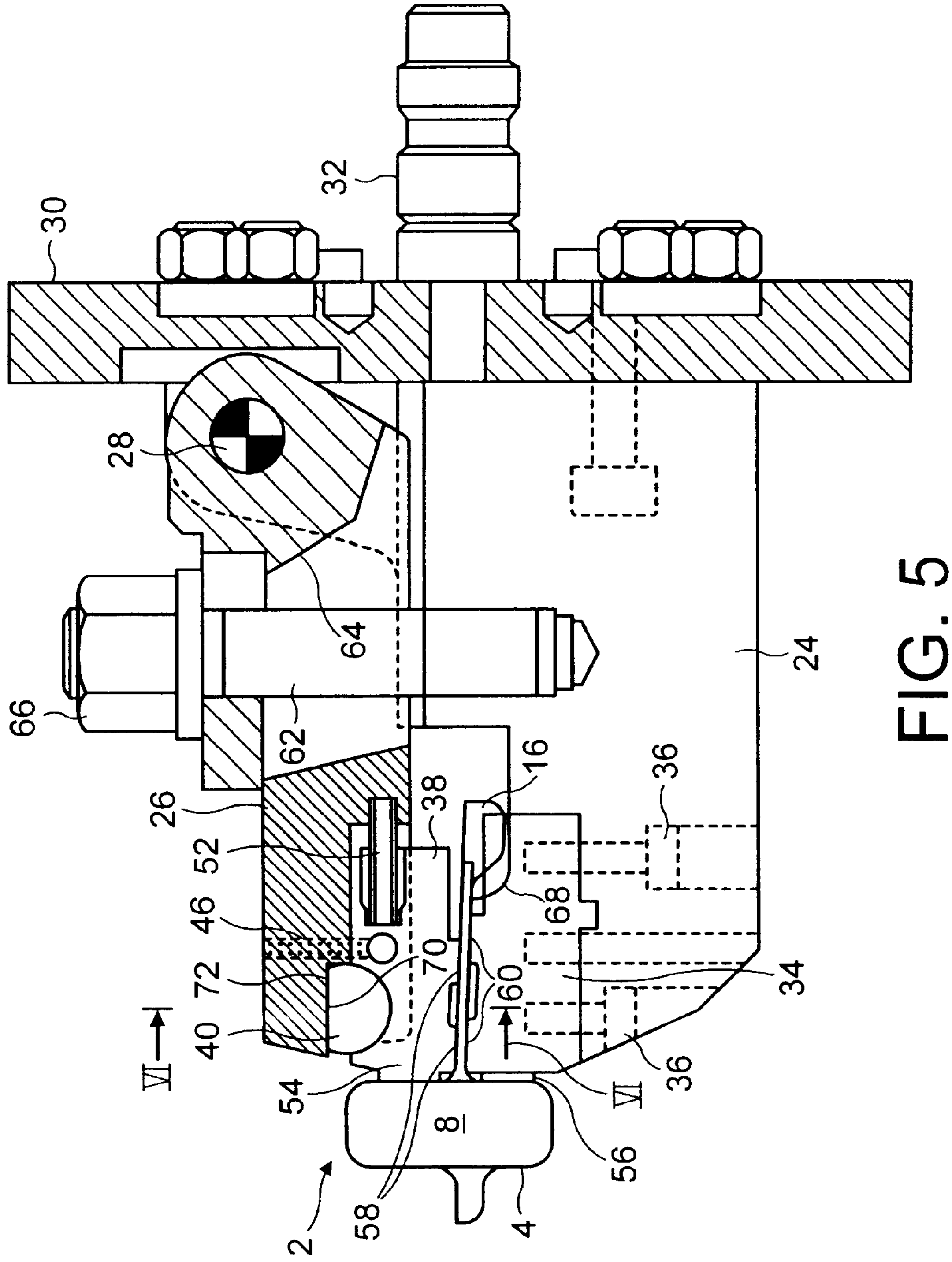
FIG. 5 is a sectioned side view of another clamp holding the aerofoil component of FIG. 1, following processing in the clamp of FIG. 2.

As shown in FIGS. 5 and 6, the forged workpiece of FIG. 1 is held by the clamp with the root 8 exposed for machining. Thus the pads 58 on the workpiece clamping element 38 and the pads 60 on the workpiece supporting element 34 engage opposite faces of the blade 6 and grip the blade 6 firmly under the action of the nut 66 on the stud 62. During clamping, the ball and socket connection provided by the ball element 40 and the hemi-spherical socket 42 permit the pads 58 on the workpiece supporting element 38 to align themselves with the contacted surface of the blade 6 so that an adequate clamping pressure can be applied to the blade 6 without marking it. The CBN plating on the pads 58 and 60 avoids slippage of the blade 6 so that the workpiece 2 will remain held securely during machining operations on the root 8. Additional support is provided by the pads 54 and 56. When installing the workpiece in the clamp, the annulus surface of the root 8 is abutted against the pad 56 on the fixed workpiece supporting element 34, the workpiece clamping element 38 then being biased by the spring 52 and the wedging action of the surfaces 70 and 72 to bring the pad 54 into abutment with the annulus surface.

The workpiece supporting element 34 has a recess 68 to accommodate the tip locating pip 16 if it has not been removed in a previous operation.

It will be appreciated that various modifications can be made to the clamps shown in FIGS. 2 to 8 to suit particular applications. For example, although four pads are shown on each of the workpiece clamping elements 38, 138 and the workpiece supporting elements 34, 134, satisfactory results may be achieved with, for example, three pads on each element.

Also, a single support body 24, 124 could be provided with separate workpiece supporting elements 34, 134 and corresponding separate clamping members 26, 126 so that a workpiece can be re-positioned on the same fixture to present appropriate parts of the workpiece for machining at different stages of operation.

We claim:

1. A clamp for clamping a workpiece, the clamp comprising:

a support body;

a workpiece supporting element mounted on the support body:

a clamping member mounted on the support body for displacement towards and away from the support body;

a workpiece clamping element mounted on the clamping member;

securing means adapted to retain the clamping member in a clamping position in which, in use, the workpiece clamping element applies a clamping force to a workpiece clamped between the workpiece clamping element and the workpiece supporting element;

connecting means which connects the workpiece clamping element to the clamping member for pivoting displacement relatively to the clamping member about axes lying in a plane extending transversely of the line of action of the clamping force, and for linear movement relatively to the clamping member in a direction substantially transverse to the line of action of the clamping force, whereby the workpiece clamping element is self-aligning with the surface of a clamped workpiece, the connecting means having a ball and socket connection which includes a part-spherical ball element mounted on the clamping member and a socket formed in the workpiece clamping element, the part-spherical ball element engaging the socket; and a retaining pin which engages the workpiece clamping member and which extends with clearance through a bore in the workpiece clamping element for retaining the workpiece clamping element on the workpiece clamping member.

2. A clamp as claimed in claim 1, in which the pivoting displacement of the workpiece clamping element is limited by contact between the workpiece clamping element and the clamping member.

3. A clamp as claimed in claim 1, in which the clamping member is hinged to the support body.

4. A clamp as claimed in claim 1, in which resilient means is provided for biasing the workpiece clamping element relatively to the clamping member in the direction of linear movement.

5. A clamp as claimed in claim 4, in which the workpiece clamping element has an abutment face for engagement with a surface of a workpiece under the action of the resilient means.

6. A clamp as claimed in claim 5, in which the workpiece supporting element has an abutment face for engagement with a surface of a workpiece, the abutment face of the workpiece supporting element being fixed with respect to the workpiece supporting member.

7. A clamp as claimed in claim 1, in which the support body is on a fixture which is adapted for releasable fitting to a machine tool.

8. A clamp as claimed in claim 1, which is adapted to receive a workpiece in the form of an aerofoil component.

9. A clamp for clamping a workpiece, the clamp comprising:

a support body;

a workpiece supporting element mounted on the support body:

a clamping member mounted on the support body for displacement towards and away from the support body;

a workpiece clamping element mounted on the clamping member;

securing means adapted to retain the clamping member in a clamping position in which, in use, the workpiece clamping element applies a clamping force to a workpiece clamped between the workpiece clamping element and the workpiece supporting element; and connecting means which connects the workpiece clamping element to the clamping member for pivoting displacement relatively to the clamping member about axes lying in a plane extending transversely of the line of action of the clamping force, the connecting means comprising a necked region formed integrally with and extending between the clamping member and the workpiece clamping element, the workpiece clamping element projecting on all sides beyond the necked region, whereby the workpiece clamping element is self-aligning with the surface of a clamped workpiece.

10. A clamp as claimed in claim 9, in which the pivoting displacement of the workpiece clamping element is limited by contact between the workpiece clamping element and the clamping member.

11. A clamp as claimed in claim 9, in which the clamping member is hinged to the support body.

12. A clamp as claimed in claim 9, in which the necked region is defined by slots extending inwardly from the outer surface of the clamping member.

13. A clamp as claimed in claim 9, in which each slot has a width which is not greater than 0.5 mm.

14. A clamp as claimed in claim 9, in which the cross-sectional area of the necked region is not greater than 20 $mm^2$.

15. A clamp as claimed in claim 9, in which the maximum pivoting angle of the workpiece clamping element relatively to the workpiece clamping member is not greater than 2°.

16. A clamp as claimed in claim 9, in which the support body comprises a locating element which is spaced from the workpiece supporting element, which locating element is adapted to engage a region of the workpiece to locate the workpiece on the support body.

17. A clamp as claimed in claim 16, in which the locating element comprises a recess adapted to receive a protrusion on the workpiece.

18. A clamp as claimed in claim 9, in which the support body is mounted on a fixture which is adapted for releasable fitting to a machine tool.

19. A clamp as claimed in claim 9, which is adapted to receive a workpiece in the form of an aerofoil component.

20. A method of performing operations on a workpiece, which method comprises:

securing the workpiece in a clamp comprising:

a support body;

a workpiece supporting element mounted on the support body:

a clamping member mounted on the support body for displacement towards and away from the support body;

a workpiece clamping element mounted on the clamping member;

securing means adapted to retain the clamping member in a clamping position in which the workpiece clamping element applies a clamping force to the workpiece clamped between the workpiece clamping element and the workpiece supporting element; and connecting means which connects the workpiece clamping element to the clamping member for pivoting displacement relatively to the clamping member about axes lying in a plane extending transversely of the line of action of the clamping force, and for linear movement relatively to the clamping member in a direction substantially transverse to the line of action of the clamping force, whereby the workpiece clamping element is self-aligning with the surface of a clamped workpiece, the connecting means having a ball and socket connection which includes a part-spherical ball element mounted on the clamping member and a socket formed in the workpiece clamping element, the part-spherical ball element engaging the socket: and a retaining pin which engages the workpiece clamping member and which extends with clearance through a bore in the workpiece clamping element for retaining the workpiece clamping element on the workpiece clamping member; and performing the operation on the clamped workpiece.

21. A method of performing operations on a workpiece, which method comprises:

securing the workpiece in a clamp comprising:

a support body;

a workpiece supporting element mounted on the support body:

a clamping member mounted on the support body for displacement towards and away from the support body;

a workpiece clamping element mounted on the clamping member;

securing means adapted to retain the clamping member in a clamping position in which the workpiece clamping element applies a clamping force to the workpiece clamped between the workpiece clamping element and the workpiece supporting element; and connecting means which connects the workpiece clamping element to the clamping member for pivoting displacement relatively to the clamping member about axes lying in a plane extending transversely of the line of action of the clamping force, the connecting means comprising a necked region formed integrally with and extending between the clamping member and the workpiece clamping element, the workpiece clamping element projecting on all sides beyond the necked region, whereby the workpiece clamping element aligns with the surface of the clamped workpiece; and performing the operations on the clamped workpiece.

* * * * *